J. W. HUNTOON.
Sewing-Machine Motors.

No. 156,161. Patented Oct. 20, 1874.

WITNESSES.
P. C. Dietrich
W. C. McArthur

INVENTOR.
J. W. Huntoon
per J. H. Alexander
ATTORNEY.

J. W. HUNTOON.
Sewing-Machine Motors.
No. 156,161.  Patented Oct. 20, 1874.
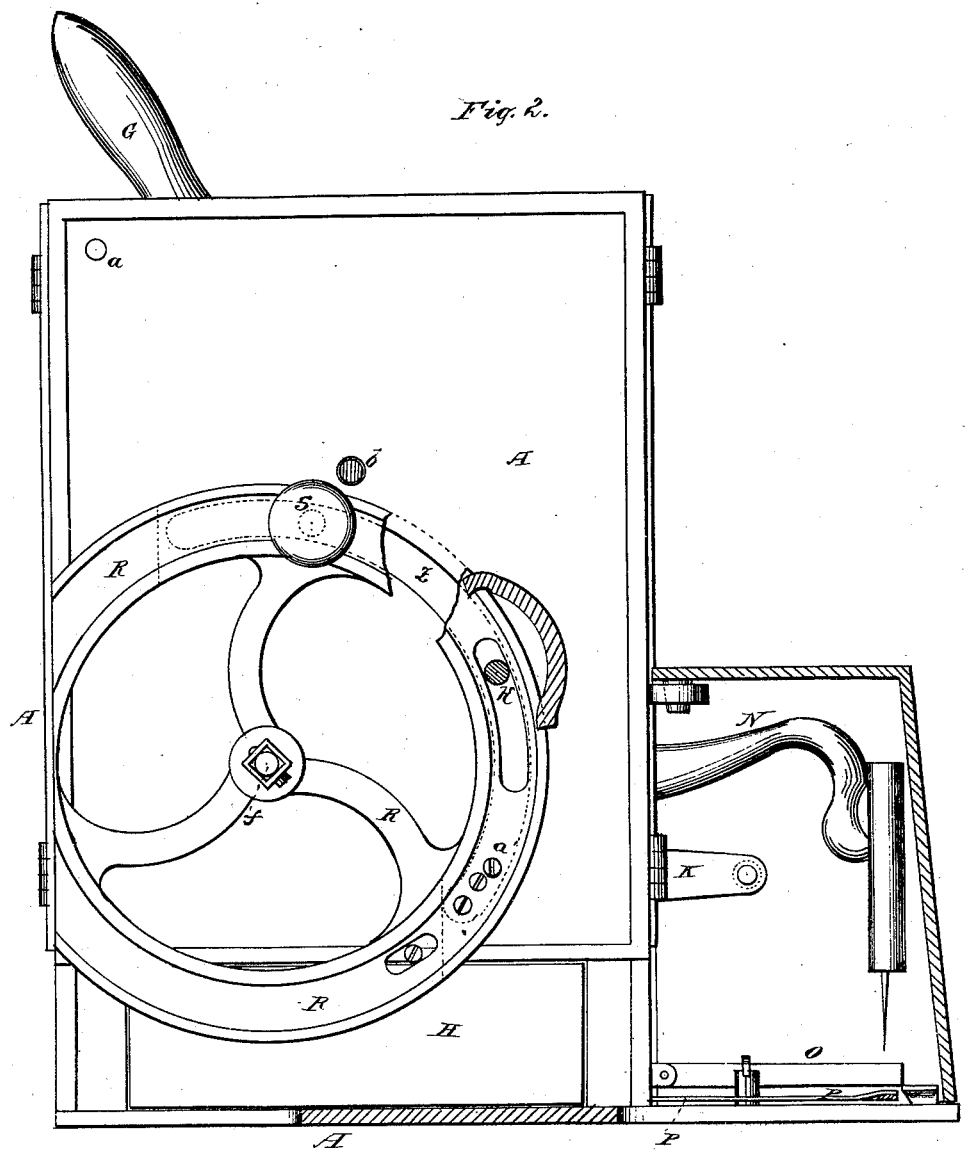
Fig. 2.
Fig. 7.
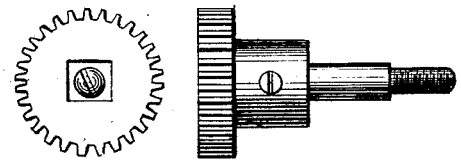
WITNESSES:  
INVENTOR 5 Sheets--Sheet 3.
J. W. HUNTOON.
Sewing-Machine Motors.
No. 156,161. Patented Oct. 20, 1874.
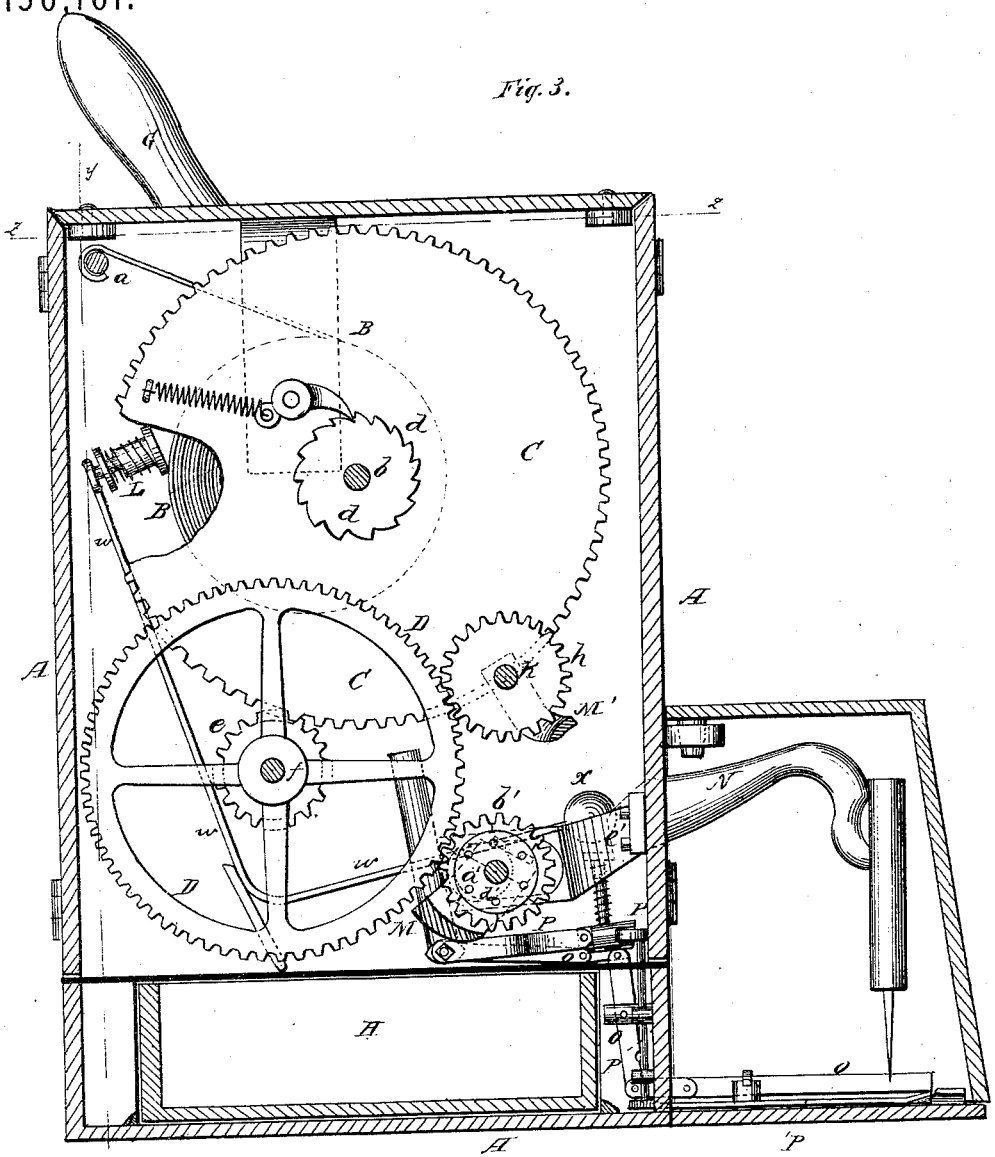
Fig. 3.
Fig. 8.
WITNESSES:
P. C. Dieterich
W. C. McArthur
INVENTOR,
J. W. Huntoon
per T. H. Alexander
ATTORNEY.

5 Sheets--Sheet 4.

J. W. HUNTOON.
Sewing-Machine Motors.

No. 156,161. Patented Oct. 20, 1874.

WITNESSES:

INVENTOR.

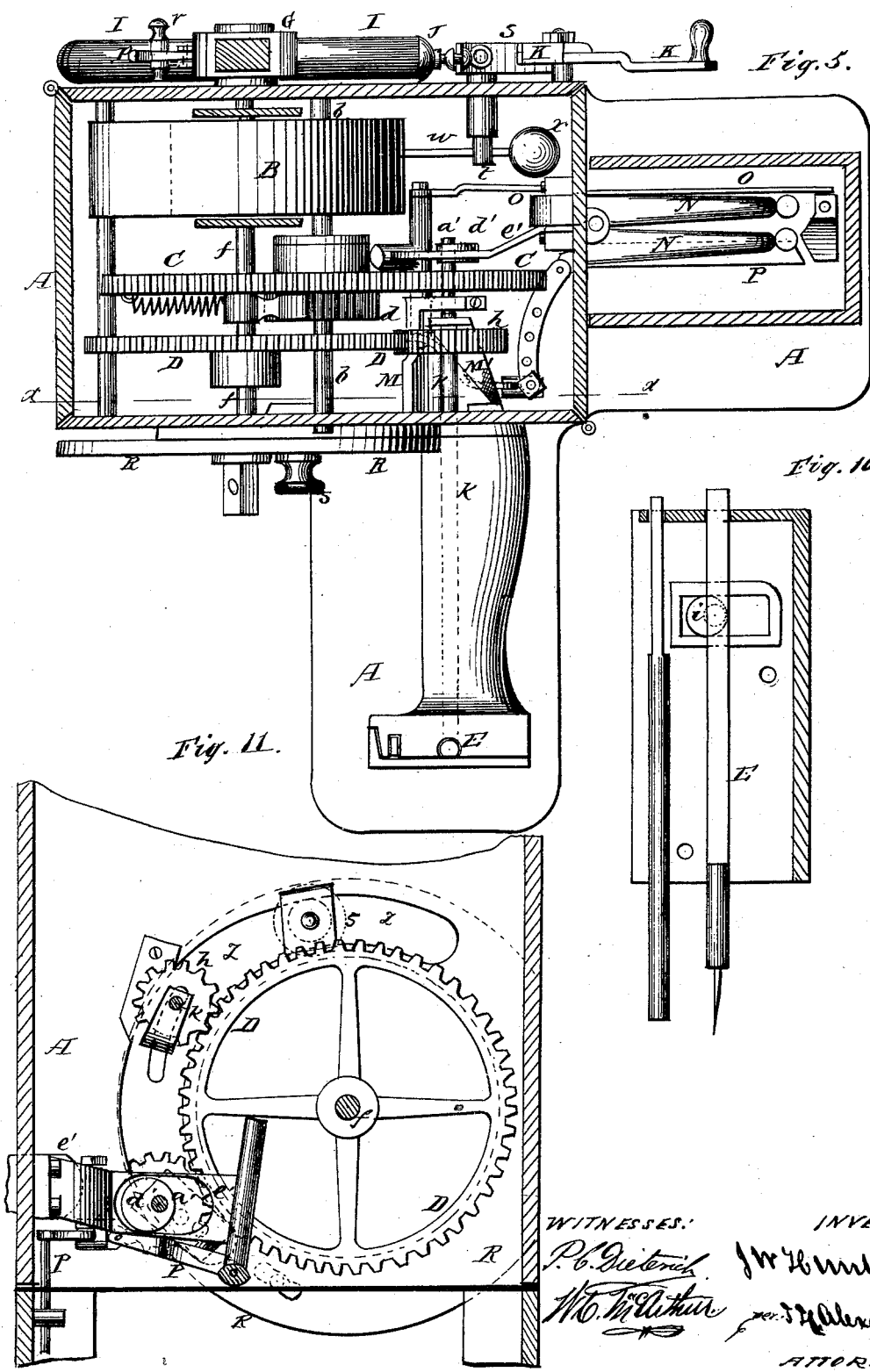

UNITED STATES PATENT OFFICE.

JAMES W. HUNTOON, OF ST. LOUIS, MISSOURI.

IMPROVEMENT IN SEWING-MACHINE MOTORS.

Specification forming part of Letters Patent No. 156,161, dated October 20, 1874; application filed October 5, 1874.

*To all whom it may concern:*

Be it known that I, J. W. HUNTOON, of St. Louis, in the county of St. Louis and State of Missouri, have invented certain new and useful Improvements in Motors for Sewing-Machines; and I do hereby declare that the following is a full, clear, and exact description thereof, reference being had to the accompanying drawings, and to the letters of reference marked thereon, which form part of this specification.

The nature of my invention consists in the construction of an automatic sewing-machine in connection with a mechanical motive-power, which power sets in effectual motion the working parts of the machine. Also, in the application of a spring-brake, which may be faced with leather or other suitable material for regulating the speed of the machine at the will of the operator, and for stopping the machine instantly when desired. Also, in so arranging the aforesaid motive-power, by the addition of extra couplings, that it can be easily applied and used as a motive-power to sewing-machines of other forms and manufacture; and, also, in the construction and combination of parts, as will be hereinafter more fully set forth.

My motive-power and mode of applying the same entirely supercedes and dispenses with the foot-treadle and crank, and saves nearly all the labor of running sewing-machines, and the machine may be run as slowly as desired, or much more rapidly than a lady can run it with a foot-treadle.

In order to enable others skilled in the art to which my invention appertains to make and use the same, I will now proceed to describe its construction and operation, referring to the annexed drawings, in which—

Figure 1:
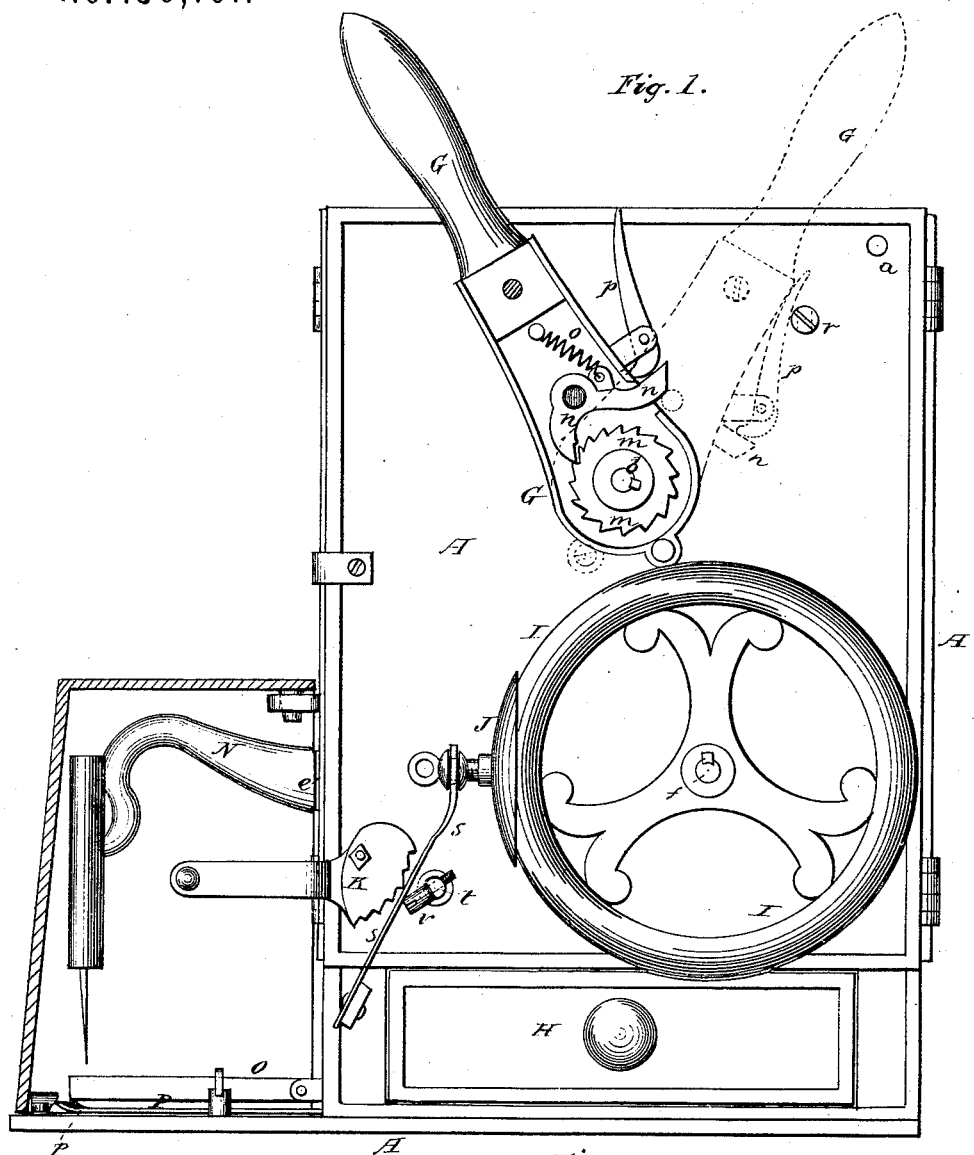
Figure 6:
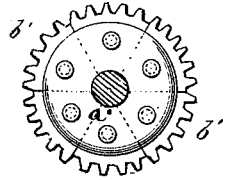
Figure 4:
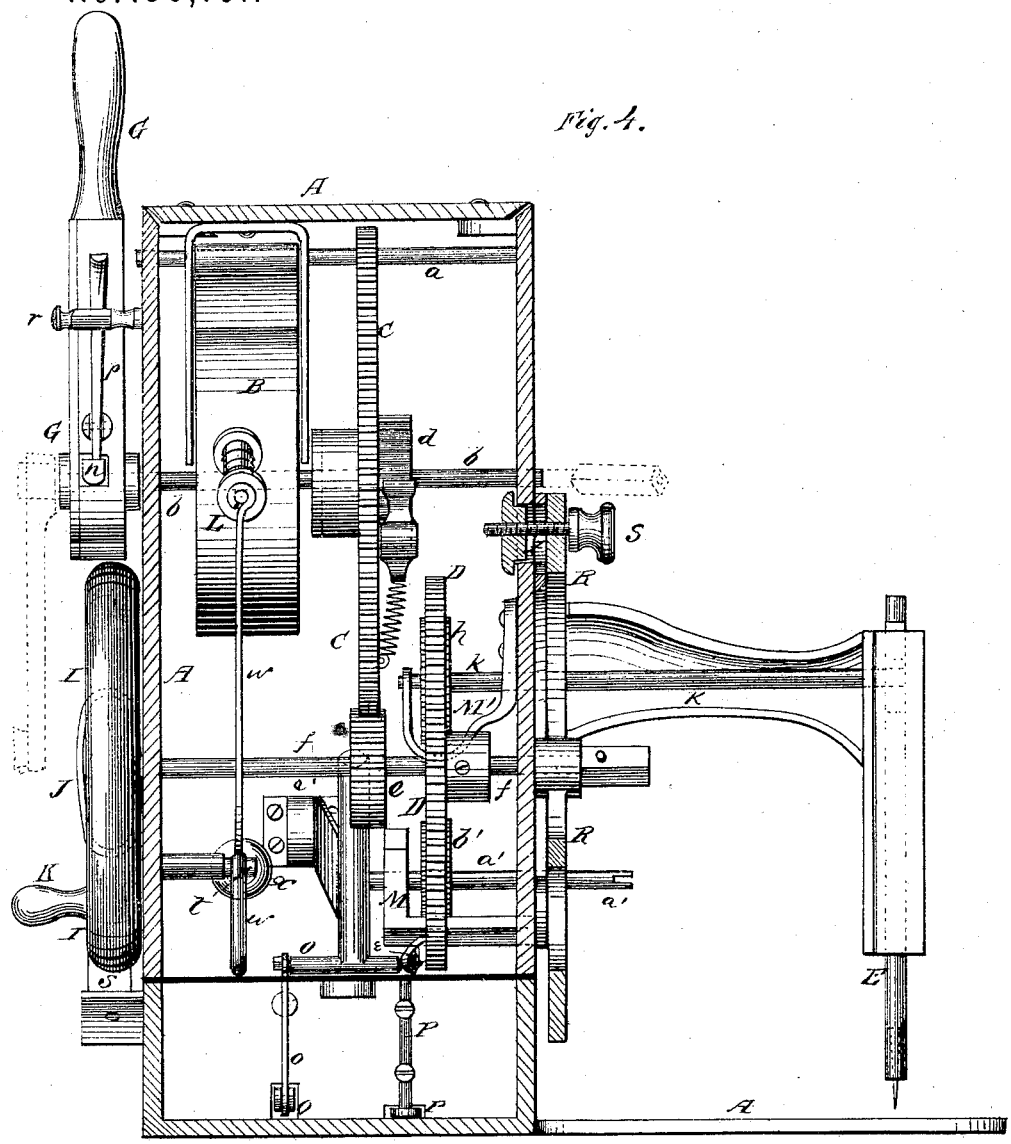
Figure 9:
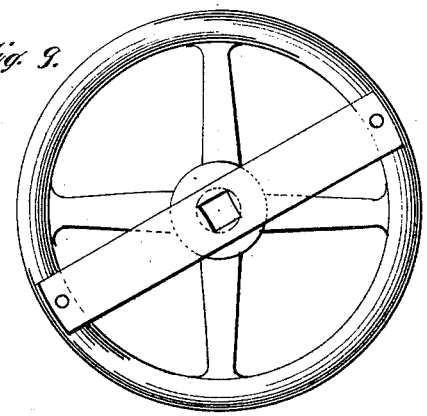

Figure 1 is a side elevation of my machine. Fig. 2 is a view of the opposite side of the machine. Fig. 3 is a vertical section on the line *x x*, Fig. 5. Fig. 4 is a vertical section on the line *y y*, Fig. 3. Fig. 5 is a vertical section on the line *z z*, Fig. 3; and Figs. 6 to 11 are detached views of parts of the machine.

A represents the frame-work of the machine, which at the same time constitutes a case or box for the motive-power, said frame or case being made of cast-iron, or any other material, in two or more parts united together by means of screws or rivets. B is a coiled sheet spring, one end of which is made fast to a shaft or rod, *a*, and the other to a shaft, *b*, having a gear-wheel, C, placed loosely upon it, and connected therewith by an ordinary pawl-and-ratchet device, *d*. The gear-wheel C works into a pinion, *e*, made fast on a shaft, *f*, upon which is another cog-wheel, D, meshing with and working a pinion, *h*, upon a shaft, *k*. This latter shaft has upon its end an eccentric, *i*, which sets in motion the needle-bar E in the manner usual for sewing-machines having a vertically-reciprocating needle-bar. One or more additional sets of cog-wheels, pinion, and shaft may be interposed if so deemed expedient. On one end of the shaft, *b*, outside of the case A, is placed loosely a lever, G, which surrounds and incloses a ratchet-wheel, *m*, fastened on the shaft. In the lever G is pivoted a pawl, *n*, held in against the ratchet-wheel by means of a spring, *o*, and having its end projecting through a slot in the side of the lever, as shown in Fig. 1. On this side of the lever is pivoted a small lever, *p*, the lower end of which bears against the projecting end of the pawl *n*. By means of the ratchet-lever G thus constructed, the spring B is easily wound up, and after winding up the machine the pawl is thrown out of the ratchet-wheel by turning the lever G to one side, so that the small lever *p* will strike a post, *r*, on the side of the case A, thus allowing the spring to exert its full force in running the machine. In place of the lever G a crank may be arranged on the end of the shaft *b* for winding up the machine. In the case A is a drawer, H, which is added for the obvious convenience of the operator, and may be at the bottom, as shown, or at the top, as would be most convenient, according as the main shaft should connect at the top or bottom of the working parts. The case is also provided with suitable doors for oiling and cleaning, after which they may be closed to perfectly protect the machine from dust. I represents a balance-wheel attached on the end of the shaft *f* outside of the case, and on this wheel bears a brake-shoe, J, attached to a spring, *s*, and pressed against the wheel by means of an eccentric corrugated step-lever, K, for controlling the speed of the machine at will, and by which the machine is started and stopped instantly at will simply by pressing the lever up or down.

The face of the brake-shoe J may be lined with leather or other suitable material, if desired.

In connection with this brake I use an interior device operated by the unwinding of the spring B and constructed as follows: Through the case is passed a short shaft, t, provided on its outer end with an arm, v, below the eccentric lever K and on the opposite side of the spring s. Through the inner end of the shaft t is passed a rod, w, on one end of which is a weight, x, and the other end is curved upward and provided with a spring-shoe, L. This shoe is pressed by the spring as it unwinds, turning the shaft t so that its arm v will raise the brake J off from the balance-wheel, the normal position of said brake being against the wheel, thus giving the full power of the spring after being partially unwound. In the opposite side of the case is a circular slot, z, in which is placed a double sliding box, M, and through this box runs a shaft, a', with a pinion, b', gearing with the cog-wheel D. The sliding box M may be moved to any point desired around the wheel D by turning the sliding cover R, to which it is attached, and thus I am enabled with ease to couple my motive-power in a direct line to sewing-machines of different sizes and construction. On the shaft a' is an eccentric, d', which operates the needle-bar N on its fulcrum e'. This eccentric also gives an elliptic motion to the feed-lever O, and also a backward and-forward motion to the shuttle-bar and lever P. The shaft k, which, by means of its eccentric i, operates the needle-bar E up and down, is also held in a box, M', in the slot z, and can be moved to suit the machine to which the power is connected.

It will thus be seen that my invention makes it perfectly convenient to obtain any or all of the motions heretofore used or desirable in sewing-machines, as it is equally easy to get a rotary or elliptic, a vibratory and fore-and-aft motion, all in any one machine if it were desirable, thus making it practicable and easy for me to construct motive-power sewing-machines of any form or mode of working by my invention, which will be much lighter, more compact and beautiful, as well as vastly more valuable by doing away with the labor of running, all of which can be at less expense than sewing-machines can be made by modes heretofore in use.

Over the slot z is an adjustable circular cover or wheel, R, to which the box M is fastened by screws, and which is held in position by a thumb-screw, S.

In Figs. 7 and 8 I have shown certain couplings, by means of which my machine can easily be connected with sewing-machines of any form or construction, my machine or power being fastened to the sewing-machine in the most convenient position for the purpose.

Having thus fully described my invention, what I claim as new, and desire to secure by Letters Patent, is—

1. In combination with a train of gearing operated by one or more springs, a movable box adjusted on a circle and carrying a shaft with a pinion to connect with the gearing, and an eccentric, or its equivalent, for operating a sewing-machine, substantially as herein set forth.

2. In combination with a train of gearing run by one or more springs for operating a sewing-machine, the brake consisting of the brake-shoe J, spring s, and eccentric corrugated lever K, substantially as and for the purposes herein set forth.

3. In combination with the brake, the shaft t with arm v, weighted rod w, and spring-shoe L, substantially as and for the purposes herein set forth.

In testimony that I claim the foregoing as my own I affix my signature in presence of two witnesses.

JAMES W. HUNTOON.

Witnesses:
JOSEPH WACHTEL,
FRANCIS NOHL.